Aug. 28, 1934.  F. W. BURGER  1,971,327
DUAL PNEUMATIC WHEEL
Filed Sept. 27, 1926
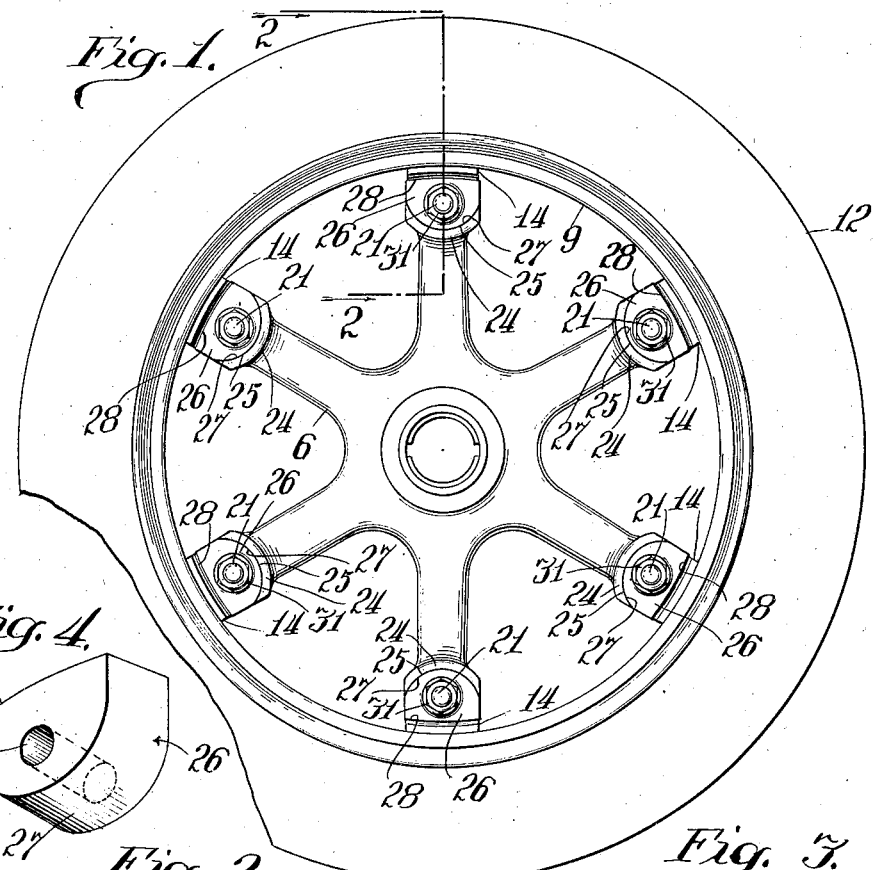
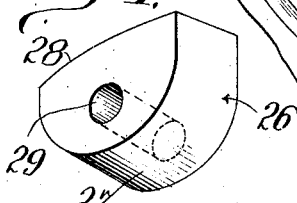
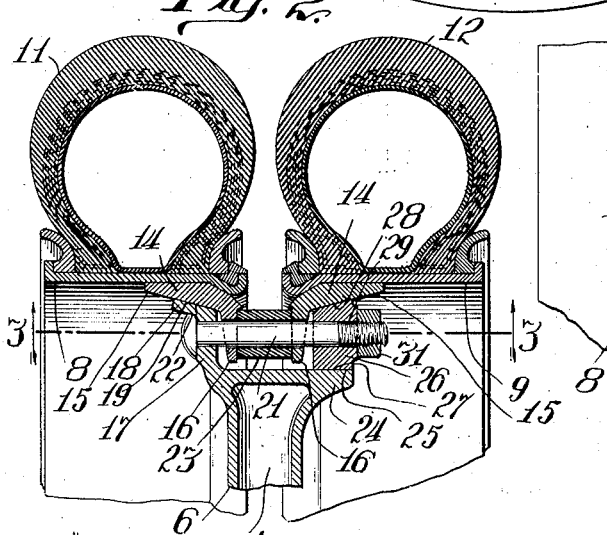
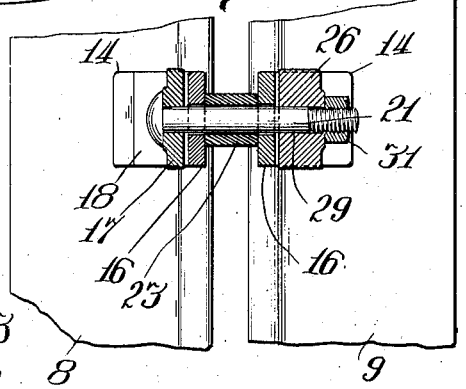
Inventor
Frederick W. Burger,
By John L. Jackson,
Attorney
Witness
Milton Lenoir Patented Aug. 28, 1934

1,971,327

UNITED STATES PATENT OFFICE 1,971,327

DUAL PNEUMATIC WHEEL

Frederick W. Burger, Niles, Mich., assignor to Clark Equipment Company, Buchanan, Mich., a corporation of Michigan Application September 27, 1926, Serial No. 137,846

REISSUED

16 Claims. (Cl. 301—13)

My invention relates to vehicle wheels of the type adapted for mounting two pneumatic tires side by side thereon, commonly termed dual pneumatic wheels, these wheels now being extensively used on heavy busses and trucks, particularly as the rear driving wheels of such vehicles.

One of the objects of the invention is to provide a simplified wheel of this type wherein both tire rims are detachably held in place on the wheel by a single set of bolts which perform a common clamping function for both rims, and wherein both rims can be quickly and easily removed from the outboard side of the wheel.

A further object is to provide a dual pneumatic wheel which will mount a standard rim, preferably of the type having inwardly extending apertured lugs, and which will receive this type of rim interchangeably on either the outboard or inboard side of the wheel.

A further object is to provide a wheel of this construction wherein both rims are positively held on the wheel against lateral stresses by tapered or wedge shaped seating surfaces; wherein both rims are positively held against circumferential slippage relative to the wheel; and wherein both ends of each clamping bolt are positively held against slipping, skewing or bending consequent upon any driving or braking torque reacting on the bolts.

Other objects of my invention pertaining to the particular details of construction of the wheel will be apparent from the following description of a preferred embodiment thereof. In the accompanying drawing illustrating this embodiment:

Fig. 1 is a fragmentary elevational view of my improved wheel, illustrating the outboard side thereof;

Fig. 2 is a fragmentary sectional view taken on the radial plane of the line 2—2 of Fig. 1;

Fig. 3 is a transverse sectional view through one of the points of clamping engagement, corresponding to a section taken on the plane of the line 3—3 of Fig. 2, and Fig. 4 is a perspective view of one of the wedge blocks.

I have illustrated the invention in a spoke wheel embodiment, and such is the preferred construction, but, as will hereinafter appear, the fundamental advantages of the invention can also be realized in a disc type of wheel. In the construction shown, the wheel comprises a central portion 6 consisting of a hub and spoke structure or spider. The hub and spokes are preferably cast as an integral unit, and the spokes are of hollow cross-section, as shown at 6' in Fig. 2. The two rims 8 and 9, corresponding to the inboard and outboard rims respectively, and carrying pneumatic tires 11 and 12, are supported in planes on the inboard and outboard sides of the spoke structure 6, this spoke structure lying in a median plane between the two tires where it will have the bearing loads of both tires distributed equally thereon. The rims 8 and 9 are duplicate standard units, having marginal flanges for receiving either a straight side or clincher type of tire. The particular construction of these flanges and their retaining rings et cetera are well-known and require no detailed description. These rims are of the type having circumferentially spaced lugs 14 riveted or welded to their inner peripheral sides, such lugs comprising tapered or wedge shaped inner surfaces 15 and radially inwardly extending apertured ears 16.

The outer end of each spoke 6' is formed with a radially extending flange 17, projecting from the end of the spoke in a plane disposed on the inboard side of the spoke structure. Sloping inwardly from the extremity of this radial flange 17 is an inclined flange 18, the radially outer surface of which affords a tapered or wedge shaped seating surface 19 for cooperating with the sloping seating surface 15 of the inboard rim 8. The radial flange 17 is apertured to receive the shank of a clamping bolt 21 which passes transversely through the apertured ears 16 of the lugs of the inboard and outboard rims. The head of this bolt bears against the side of the radial flange 17, and one edge of the bolt head is milled off, as indicated at 22, for bearing against the sloping flange 18 to prevent the bolt from turning. A tubular separator or spacing sleeve 23 is supported on the bolt 21 between the opposing faces of the lug portions 16, this spacing sleeve transmitting the clamping pressure from the outboard rim to the inboard rim for forcing the inboard rim into wedging engagement on the wedge surface 19 of the spoke flange 18.

The opposite or outboard side of each spoke end is formed with a laterally projecting flange 24 which, as viewed from the outboard side of the wheel (Fig. 1) is given an arcuate curvature to form an outwardly opening socket having a curved bottom wall 25. Engaging in this curved socket is a wedge block 26 having a semi-cylindrical radially inner or bottom surface 27 for matching with the bottom wall 25 of the socket, and having a tapered or wedge shaped radially outer surface 28 for cooperating with the sloping surface 15 of the outboard rim lug 14. The clamping bolt 21 passes through a hole 29 in this wedge block, and receives a nut 31 on its outer threaded end. As shown in Fig. 2, the semi-cylindrical bottom wall 25 of the curved socket 24 preferably extends in a plane parallel with the normal axis of the bolt 21 so that in forcing the wedge block into clamping engagement it is forced tightly against the curved bottom wall or seat 25 and therefore is self centering. I thus provide a solid drive between the hub and spoke structure, or spider, and the rim. Furthermore, no binding action can occur between the wedge block and bolt—all of the wedge action of the block occurring between the sloping surface 28 thereof and the wedge surface 15 of the outer rim lug 14. The fixed flange 18 and the movable wedge block 26 constitute, in effect, a pair of clamping members between which the rim lugs 16 are securely clamped to the wheels. Thus, the one operation of tightening the bolts effectively secures both rims in place on the wheel.

The foregoing construction is provided at the radially outer end of each spoke 6', and both rims have lugs 14 corresponding to the number of such spokes. In mounting the rims on the central portion 6 of the wheel the inboard rim 8 is first slipped over the spoke ends, the apertured lug portions 16 of the rim being engaged over the bolts 21. The separators or spacing sleeves 23 are now slipped over the bolts to bear against the lugs of the inboard rim, after which the outboard rim 9 is slipped over the spoke ends with the clamping bolts 21 passing through the apertured lug portions 16 thereof. Thereupon the wedge blocks 26 are placed on the projecting ends of the bolts and are drawn up by screwing the nuts 31 in against these wedge blocks. The clamping pressure applied to the wedge blocks is first effective in shifting the outboard rim axially inwardly along the bolts 21, this shifting movement being then taken up by the spacers and forcing the inboard rim laterally across the sloping surfaces 19 of the spoke ends. As the inboard rim is being forced into rigid wedging engagement on these sloping surfaces, the outboard rim is likewise being wedged in rigid engagement on the sloping surfaces 28 of the wedge blocks. Thus, both rims are brought into a wedged mounting on the wheel simultaneously through this single set of bolts. With both rims firmly mounted on the wheel, lateral stresses reacting against either tire will be resisted by these wedge surfaces. Thus, lateral outward thrust against the outboard tire will be borne by the wedge blocks 26 and lateral inward thrust will be transmitted through the spacers 23 to the radially inner wedge surfaces 19. This is also true in reversed relation with respect to the inboard tire. Circumferential stresses reacting through the inboard tire will be positively resisted by the engagement of the lug portions 16 of the rim over the bolts 21; and similarly with the outboard tire. Such circumferential stresses are incapable of twisting or bending the bolts sideways because the outboard ends of the bolts are anchored in the wedge blocks, and the wedge blocks in turn are positively held against circumferential slippage because of their seating in the recessed sockets 24. With both rims firmly clamped in position, it will be observed that the rims constitute a felloe portion for the spider-like spoke structure 6.

The removal of either rim is effected from the outboard side of the wheel by simply removing the nuts 31, and possibly tapping the rim to release its wedged engagement.

While I have shown what I consider a preferred embodiment of my invention, it will be understood that the invention is not strictly limited thereto. For example, instead of having an interrupted wedge surface 19, only effective at the extremities of the spokes, this wedge surface might be a continuous surface, formed on a felloe joining the spoke ends, or constituting the outer portion of a disc wheel. Similarly, the wedge surface 28 might be formed as a continuous surface on a removable ring, the latter having suitable means acting in conjunction with the wheel or spider structure, analogous to the sockets 24 and the interfitting surfaces 27, for holding the ring against circumferential slippage.

What I claim as my invention and desire to secure by Letters Patent, is—

1. In a wheel for mounting two pneumatic tires, the combination of a spoke structure, a laterally sloping wedge surface formed at the outer end of each spoke on the inboard side thereof, an inboard rim having a radially inwardly extending lug adapted to seat on said wedge surface, a bolt carried by each spoke and adapted to pass through said rim lug, a socket formed in the outboard portion of each spoke, a wedge block seating in each socket and having a wedge surface thereon, an outboard rim having a radially inwardly extending lug bearing on said latter wedge surface, said bolt passing through said lugs, and a separating sleeve engaging over said bolt between the opposing faces of said lugs.

2. In a rim securing means for the hub and spoke structure of a vehicle wheel, said structure having a plurality of spokes, dual rims mounted on said spokes, a flange extending substantially radially from each spoke end, a laterally sloping wedge surface projecting radially inwardly from the inboard side of each radial flange, clamping bolts carried by said radial flanges and extending towards the outboard side of the wheel, arcuate sockets formed in said spoke ends adjacent the outboard side of the wheel, wedge blocks having curved surfaces seating in said sockets and having holes engaging over said clamping bolts, wedge members engageable with said rims and secured on said spokes between said laterally sloping wedge surfaces and said wedge blocks, nuts screwing over said bolts on the outboard sides of said wedge blocks, and spacing sleeves engaging over said clamping bolts.

3. In a wheel structure for mounting two pneumatic tires, the combination of a spoke structure, a laterally sloping wedge surface at the outer end of each spoke and on the inboard side thereof, an inboard rim having radially inwardly extending lugs rigidly attached thereto at substantially the outboard edge and adapted to seat on said wedge surface, a bolt carried by each spoke and adapted to pass through the adjacent rim lug, the outboard portion of each spoke having a socket formed therein, a wedge block seating in each socket and having a wedge surface thereon, an outboard rim having radially inwardly extending lugs rigidly attached thereto at substantially the inboard edge and adapted to bear on said latter wedges, said bolts passing through said last mentioned lugs, and separating sleeves positioned between the opposing faces of said lugs.

4. In a wheel structure for mounting two pneumatic tires, the combination of a spoke structure, each having at the radially outer end and on the inboard side thereof a laterally sloping wedge surface, an inboard rim having radially inwardly extending lugs, one for each spoke, the lugs being rigidly attached to the inboard rim at substantially the outboard edge and adapted to seat on the sloping wedge surface of each spoke, the outboard face of said lugs being substantially radial, a bolt carried by each spoke and adapted to pass through said rim lugs, a socket formed in the outboard portion of each spoke and opposite said laterally sloping wedge surface, a wedge block seating in each socket and having a wedge surface thereon, an outboard rim having radially inwardly extending lugs rigidly attached thereto at substantially the inboard edge thereof and adapted to bear on said latter wedges, the inboard faces of said last mentioned lugs being substantially radial, said bolts passing through said last mentioned lugs, and short spacing sleeves positioned over said bolts and provided with parallel faces abutting the above mentioned radial faces of said lugs.

5. In a wheel for mounting two tire rims having radially inwardly extending lugs, the combination of a central wheel portion, means providing a plurality of pairs of clamping members for clamping the lugs of both of the rims on said central wheel portion, spacing members disposed between each pair of inwardly extending lugs, a series of bolts extending through said spacing members and cooperating with said clamping members to exert a simultaneous clamping pressure through said clamping members on the lugs of both of said rims, the radially inwardly extending lugs on said rims fitting between the clamping members, one of the clamping members of each pair being integral with the wheel portion, and the other slidable along the adjacent bolt, and one of said rims having bearing support directly upon the central wheel portion outwardly of one side of the radially inwardly extending lugs on the rims, and the other rim having bearing support upon the central wheel portion through said slidable clamping member outwardly of the other side of the lugs on the rims.

6. In a wheel for mounting two tire rims having radially inwardly extending lugs, the combination of a central wheel portion, clamping means providing a plurality of pairs of clamping members for clamping the lugs of both of said rims on said central wheel portion, spacing members associated with said clamping members, a single set of bolts extending through said spacing members and cooperating with said clamping members to exert clamping pressure on the lugs of both of said rims, the radially inwardly extending lugs on said rims fitting between the clamping members, one of the clamping members of each pair being integral with the wheel portion, and the other slidable along the adjacent bolt, and one of said rims having bearing support directly upon the central wheel portion outwardly of one side of the radially inwardly extending lugs on the rims, and the other rim having bearing support upon the central wheel portion through said slidable clamping member outwardly of the other side of the lugs on the rims.

7. A dual wheel comprising a central wheel portion having spokes radiating therefrom, a pair of rims mounted thereon, said rims having radially inwardly extending lugs, wedge surfaces on each of said lugs, means for detachably mounting said rims on said central wheel portion with the lugs of said rims facing radially inwardly in opposing relation, said means comprising a flanged wedging surface integral with said spokes and a detachable block having a wedging surface thereon, both of said latter surfaces engaging the wedging surfaces of said lugs to draw the latter together and to exert a pressure tending to move said rims substantially radially of said wheel.

8. In a wheel for mounting two tire rims having radially inwardly extending lugs, the combination of a central wheel portion, a pair of radially outwardly extending members providing two inclined wedging surfaces for embracing the lugs of both of the rims on said central wheel portion, spacing members disposed between said lugs and a series of bolts extending through said radially outwardly extending members and said spacing members, and exerting a simultaneous outward radial clamping pressure through said wedging surfaces on the lugs of both of said rims.

9. In a wheel, in combination, two detachable tire rims, each having a plurality of radially inwardly extending apertured lugs with inclined wedge surfaces thereon, said rims being arranged with their lugs in opposed relation, a central wheel body having pairs of clamping wedge members adapted to cooperate with said lugs, one member of each pair being fixed relative to the wheel body and the other member being movable, and bolt means passing through said fixed wedge member, said apertured lugs, and said movable wedge member whereby to clamp said rims to the wheel body against lateral and circumferential displacement thereon.

10. A dual demountable rim wheel comprising a central wheel member having an inclined wedge surface at one side of the peripheral portion thereof, an open semi-cylindrical socket at the other side of the peripheral portion thereof, a wedge block rounded at its radially inwardly facing surface to fit in said socket and having an inclined radially outwardly facing wedge surface curved on a radius substantially different from that of the said rounded surface, rims having radially inwardly extending lugs seated respectively on said wedge surfaces, a bolt mounted in said central wheel member and said lugs, said bolt being operable to move said wedge block into binding engagement with one of said lugs, and means operable by the tightening of said bolt to bind the other rim lug on the wedge surface on which it is seated.

11. A dual demountable rim wheel comprising a central wheel member having at one side of the peripheral portion thereof an inclined wedge surface facing towards the central plane of said wheel member, and at the other side thereof an open semi-cylindrical socket, a wedge block movable laterally towards said central plane and rounded at its radially inwardly facing surface to fit in said socket and having a wedge surface inclined oppositely to said first mentioned wedge surface, a pair of rims including radially inwardly extending lugs having laterally and oppositely inclined wedge surfaces adapted to seat respectively on the aforesaid wedge surfaces, and means for forcing the wedge surfaces of said lugs into binding engagement with the surfaces on which they are respectively seated.

12. In combination with a central wheel portion including spokes, a pair of rims mounted on the ends of said spokes, radially inwardly projecting lugs mounted on said rims, sockets formed in the ends of the spokes and adapted to receive said lugs, each of the said sockets having a wall at one side thereof, the said walls of said sockets being each formed to provide a wedging surface, a wedge member movable in each of said sockets and provided with a wedging surface cooperating with the wedging surface on the socket wall, said cooperating wedging surfaces being adapted to contact with corresponding wedging surfaces on said lugs, and bolts passing through said sockets and adapted to draw said first named wedge surfaces together to exert an outward radial force against said rims.

13. A dual rim wheel comprising two tire rims having radially inwardly extending lugs, there being wedging surfaces on said lugs, a central wheel body including radially extending spokes, wedging means on said spokes for exerting a force against the surfaces on said lugs for detachably mounting said rims on said central wheel body with the lugs of said rims facing inwardly toward the central plane of the wheel in opposing relation, and removable spacing members between said lugs, both of said rims and said spacing members being adapted to be dismounted and assembled directly from the outboard side of the wheel body.

14. A vehicle wheel having a plurality of hollow spokes, each having a rim seat at the radially outward end thereof at the inboard side and a recess at the outboard side having a rim-clamp supporting surface, a rim-clamp movable in an inboard direction in respect to said surface and presenting a rim seat, a pair of rims engaging said rim seats and each having a lug extending in an inward radial direction and movable axially through said recess, means extending through said rim-clamp for forcing said rim-clamp toward said first mentioned rim seat, and means for spacing said rims, said spacing means serving to force the inboard rim onto the first mentioned seat.

15. In a vehicle wheel, a rim securing means including a wheel body portion having an axially extending, approximately semi-cylindrical recess open at its radially outer side, a bolt extending in an axial direction within said recess, a member having an inclined outboard surface serving as a rim seat, and a radially inwardly extending wall disposed in said recess and movable therein along said bolt, and in a direction parallel to the wheel axis, said member being supported and guided by said wheel body portion against tilting or radially inward movements, and a nut on said bolt for forcing said member along said recess and applying pressure to the rim in a direction having inboard and radially outward components.

16. In combination with a central wheel portion including spokes, rim means mounted on the ends of said spokes, radially inwardly projecting lugs mounted on said rim means, sockets formed in the ends of the spokes and adapted to receive said lugs, each of said sockets having a wall at one side thereof, the said walls of said sockets being each formed to provide a wedging surface, a wedge member movable in each of said sockets and provided with a wedging surface cooperating with the wedging surface on the socket wall, said cooperating wedging surface being adapted to contact with corresponding wedging surfaces on said lugs, and bolts passing through said sockets and adapted to draw said first named wedge surfaces together to exert an outward radial force against said rim means.

FREDERICK W. BURGER.